UNITED STATES PATENT OFFICE.

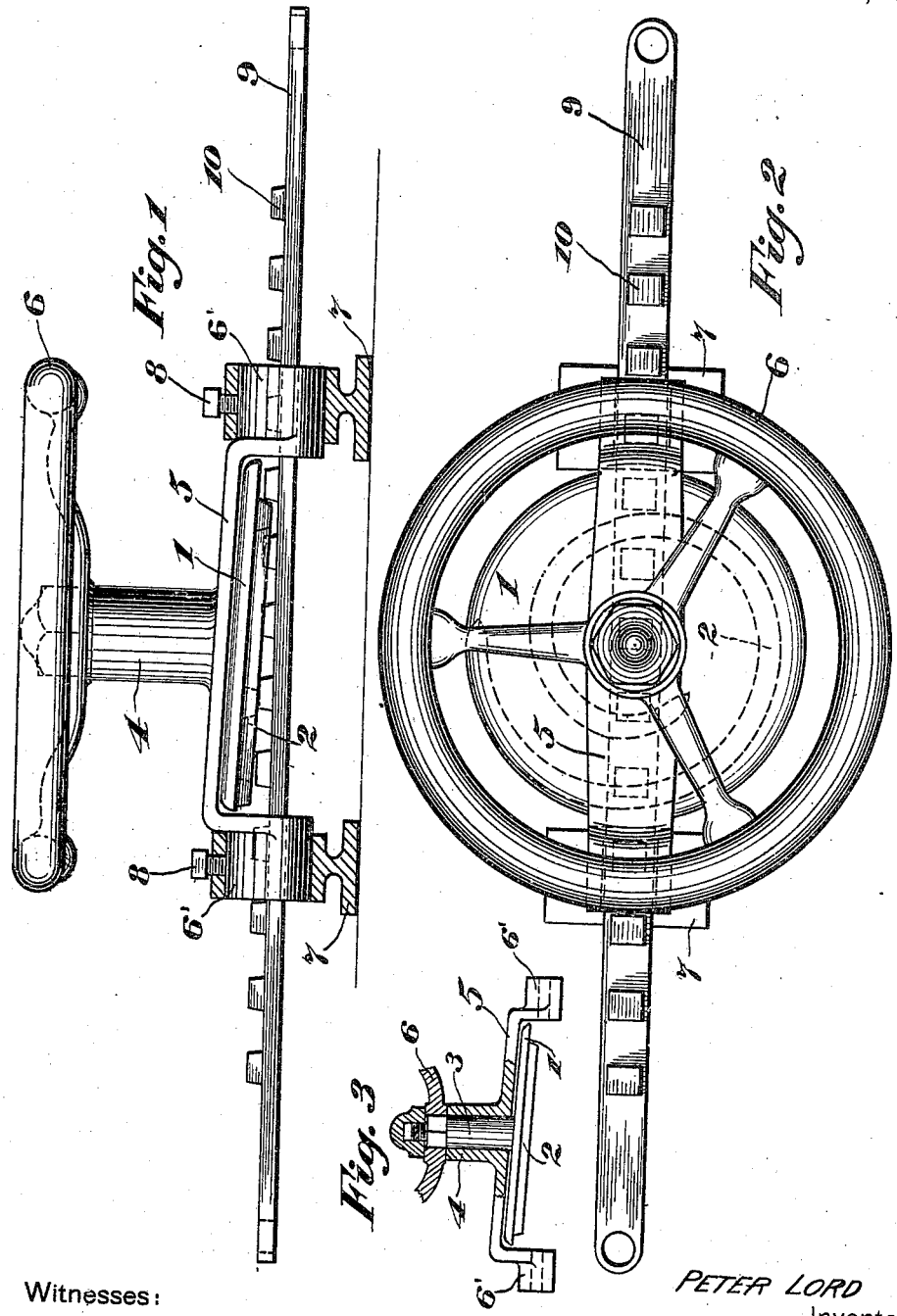

PETER LORD, OF MONTREAL, QUEBEC, CANADA, ASSIGNOR OF ONE-FOURTH TO JOSEPH A. H. HERBERT, ONE-FOURTH TO CHARLES LELUAU, AND ONE-EIGHTH TO GUSTAV ITZWEIRE, ALL OF MONTREAL, CANADA.

MECHANICAL MOVEMENT.

987,385.      Specification of Letters Patent.      Patented Mar. 21, 1911.

Application filed July 9, 1909. Serial No. 506,737.

*To all whom it may concern:*

Be it known that I, PETER LORD, a subject of the King of Great Britain, residing in the city and district of Montreal, in the Province of Quebec, Canada, have invented certain new and useful Improvements in Mechanical Movements; and I do hereby declare that the following is a full, clear, and exact description of the invention, such as will enable others skilled in the art to which it appertains to make and use the same.

This invention relates to mechanical movements which operate an endwise movable rack by the engagement of a cam-flange on a rotary disk and the said invention consists mainly in the combination with the aforesaid elements of additional features which adapt said disk to be tilted on longitudinal journals as well as rotated about a vertical axis and to certain details of construction, all substantially as hereinafter more particularly set forth and claimed.

In the drawings: Figure 1 is a side elevation of the invention, showing the supporting collars or bearings in section; Fig. 2 is a plan view of Fig. 1; and, Fig. 3 is a detail sectional view through the sleeve or upright bearing of the disk post or upright stem.

The device is adapted to be used wherever it is desired to convert rotary into linear motion, and is therefore especially useful in combination with various forms of steering or guiding mechanisms. The single instance shown in the drawings illustrates the device as applied to the steering mechanism of a small boat.

Referring to the drawings in detail, 1 indicates a broad disk provided on its under face with a broad spiral or worm, or cam flange 2. This plate is provided with an upwardly extending post or stem 3, adapted to rotate freely in a sleeve or upright bearing 4, projecting upwardly from a supporting bracket 5. To the upper end of the post 3 is suitably connected a hand wheel 6, by which the disk may be rotated. The bracket 5 is provided with horizontal enlarged hollow journals 6', adapted to be revolubly seated in collars or bearings 7 provided with binding or set screws 8, which bear on said journals, clamping said bracket and disk in the position of inclination to which they have been adjusted. A rack bar 9 provided with rack teeth 10 slides endwise through guide ways formed in the undersides of bearings 7. The disk 1 is mounted at such inclination as will insure engagement between the worm 2 and one rack tooth 10 at a time. One-half of the worm will be inoperative, while the other half is operative, as shown in Fig. 1. Consequently, as the disk 1 revolves, the worm 2 will engage the rack teeth 10 successively and force the rack bar 9 longitudinally. A part of the worm 2 will always lie between two of the rack teeth 10 and thereby prevent movement of the rack bar in either longitudinal direction, except by rotation of the disk 1. This construction, therefore, provides an absolute and sure lock so that movement of the rack bar 9 and attached parts is in absolute control of the operator.

In many cases it will be desired to swing the bracket 5 to accommodate the worm 2 to lateral inclinations of the rack bar 9. When the bracket has been so swung, it should be securely locked in position, of course. Such locking may be effected by the thumb nuts or set screws 8, passing through the collars 7 and binding against the sleeves 6'. These collars, of course, may be secured by any suitable means in any desired positions.

It is thought that the operation and use of the invention will be clear from the preceding detailed description.

Changes may be made in the construction, arrangement and disposition of the several parts of the invention, without in any way departing from the field and scope of the same, and it is meant to include all such within this application, wherein only a preferred form has been disclosed.

Having thus fully described my invention, what I claim as new and desire to secure by Letters Patent, is:—

1. In combination with an endwise movable rack, a rotary disk provided with a cam-flange for engaging the teeth of said rack to operate the latter, means for supporting said disk permitting it to rotate and also to tilt out of the horizontal position and means for clamping it in any position to which it may thus be tilted.

2. In combination with an endwise movable rack, a disk provided with a cam flange adapted to engage the teeth of said rack, a bracket which supports said disk and allows the latter to turn independently approximately in an independent plane, fixed supporting bearings in which cylindrical horizontal parts of said bracket are journaled to permit the tilting of said bracket and disk and supporting screws working through said bearings against said cylindrical parts to lock said bracket and disk in any desired position of tilting to which they may be adjusted.

3. In combination with an endwise movable rack, a disk provided with a cam flange for engaging the teeth of said rack and also with an upwardly extending stem, a handwheel detachably connected to said stem, a bracket provided with terminal horizontal journals and an integral upright bearing sleeve receiving said stem and permitting it to turn therein, bearings which receive said journals and permit them to turn for tilting said bracket and the parts carried thereby, and screws working through said bearings against said journals to lock said bracket and supported parts in any position of inclination to which they may be adjusted substantially as set forth.

In witness whereof I have hereunto set my hand in the presence of two witnesses.

PETER LORD.

Witnesses:
L. A. GAUVIN,
W. S. BABCOCK.

---

Copies of this patent may be obtained for five cents each, by addressing the "Commissioner of Patents, Washington, D. C."

Correction in Letters Patent No. 987,385.

It is hereby certified that the name of the first-mentioned assignee in Letters Patent No. 987,385, granted March 21, 1911, upon the application of Peter Lord, of Montreal, Quebec, Canada, for an improvement in "Mechanical Movements," was erroneously written and printed "Joseph A. H. Herbert," whereas said name should have been written and printed *Joseph A. H. Hebert;* and that the said Letters Patent should be read with this correction therein that the same may conform to the record of the case in the Patent Office.

Signed and sealed this 18th day of April, A. D., 1911.

[SEAL.]

C. C. BILLINGS,
*Acting Commissioner of Patents.*